United States Patent
Kurokawa

(10) Patent No.: US 9,310,915 B2
(45) Date of Patent: Apr. 12, 2016

(54) TOUCH PANEL AND DRIVING METHOD THEREOF

(75) Inventor: Yoshiyuki Kurokawa, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 1738 days.

(21) Appl. No.: 12/644,928

(22) Filed: Dec. 22, 2009

(65) Prior Publication Data
US 2010/0156851 A1 Jun. 24, 2010

(30) Foreign Application Priority Data
Dec. 24, 2008 (JP) ................................. 2008-327901

(51) Int. Cl.
*G06F 3/042* (2006.01)
*G06F 3/041* (2006.01)

(52) U.S. Cl.
CPC .................................. *G06F 3/0412* (2013.01)

(58) Field of Classification Search
None
See application file for complete search history.

(56) References Cited

U.S. PATENT DOCUMENTS

| | | | |
|---|---|---|---|
| 5,543,589 A | 8/1996 | Buchana et al. | |
| 6,747,638 B2 | 6/2004 | Yamazaki et al. | |
| 7,068,254 B2 | 6/2006 | Yamazaki et al. | |
| 7,737,957 B2 | 6/2010 | Lee et al. | |
| 7,773,023 B2 | 8/2010 | Dosho et al. | |
| 7,804,479 B2 | 9/2010 | Furukawa et al. | |
| 7,855,670 B2 | 12/2010 | Dosho et al. | |
| 8,228,310 B2 | 7/2012 | Lee et al. | |
| 2006/0066523 A1 | 3/2006 | Arai et al. | |
| 2006/0119590 A1* | 6/2006 | Park et al. | 345/175 |
| 2006/0220077 A1 | 10/2006 | Hayashi et al. | |
| 2007/0070056 A1 | 3/2007 | Sato et al. | |
| 2007/0114532 A1* | 5/2007 | Yamazaki et al. | 257/59 |
| 2007/0132620 A1* | 6/2007 | Nakamura | 341/144 |
| 2008/0170028 A1* | 7/2008 | Yoshida | 345/100 |
| 2009/0088209 A1* | 4/2009 | Atkinson et al. | 455/557 |
| 2009/0153438 A1* | 6/2009 | Miller et al. | 345/55 |
| 2010/0156850 A1 | 6/2010 | Kurokawa | |

FOREIGN PATENT DOCUMENTS

| | | |
|---|---|---|
| EP | 0 684 579 A2 | 11/1995 |
| EP | 2 040 382 A1 | 3/2009 |
| EP | 2 139 118 A2 | 12/2009 |

(Continued)

OTHER PUBLICATIONS

Invitation to Pay Additional Fees, International Searching Authority re application No. PCT/JP2009/070437, dated Jan. 26, 2010.

(Continued)

*Primary Examiner* — Joseph Feild
*Assistant Examiner* — Henok Heyi
(74) *Attorney, Agent, or Firm* — Husch Blackwell LLP

(57) ABSTRACT

An object is to provide a touch panel with high-accuracy and high-speed operation. A touch panel includes a plurality of pixels each including a display element and a photo sensor, a photo sensor reading circuit to which an output signal of the photo sensor is provided, a display element select circuit which provides an image signal to the display element, a plurality of edge sensitive latches provided in series, and a logic circuit. The logic circuit generates a signal by performing a logic operation on an output signal of the plurality of edge sensitive latches and provides the generated signal to the photo sensor reading circuit.

26 Claims, 13 Drawing Sheets

(56) References Cited

FOREIGN PATENT DOCUMENTS

| EP | 2 146 435 A2 | 1/2010 |
|---|---|---|
| JP | 6-161627 | 6/1994 |
| JP | 07-319607 A | 12/1995 |
| JP | 2001-292276 | 10/2001 |
| JP | 2002-27331 | 1/2002 |
| JP | 2002-33823 | 1/2002 |
| JP | 2005-333316 A | 12/2005 |
| JP | 2006-203929 A | 8/2006 |
| JP | 2006-244218 | 9/2006 |
| JP | 2006-317682 A | 11/2006 |
| JP | 2007-87393 | 4/2007 |
| JP | 2007-94606 | 4/2007 |
| JP | 2007-183706 | 7/2007 |
| JP | 2008-15755 | 1/2008 |
| JP | 2008-21208 | 1/2008 |
| JP | 2008-242468 A | 10/2008 |
| WO | WO 2008/069144 A1 | 6/2008 |

OTHER PUBLICATIONS

Tanaka, K. et al, "A CG Silicon System LCD with Multi-Mode Optical Input Function," The Japan Society of Applied Physics, AM-FPD '08 Digest of Technical Papers, Jul. 2, 2008, pp. 89-92.

Taiwanese Office Action re Application No. TW 98142526, dated Nov. 18, 2014.

\* cited by examiner

TOUCH PANEL AND DRIVING METHOD THEREOF

TECHNICAL FIELD

The invention disclosed in this specification relates to a touch panel including a touch sensor and a driving method thereof. In particular, the invention relates to a touch panel in which pixels each including a touch sensor are arranged in matrix and to a driving method of the touch panel. Further, the invention relates to electronic devices including the touch panel.

BACKGROUND ART

In recent years, a display device provided with a touch sensor has attracted attention. The display device provided with a touch sensor is called a touch panel, a touch screen, or the like (hereinafter referred to simply as a touch panel). The touch sensor is classified by principle of operation under resistive touch sensor, capacitive touch sensor, optical touch sensor, and the like. In any type of touch sensor, data can be input when an object is in contact with or adjacent to a display device.

When a sensor which detects light is provided as an optical touch sensor (also referred to as a photo sensor) in the touch panel, a display screen also serves as an input region. One example of a device including such an optical touch sensor is a display device having an image capturing function, which is enabled by providing a contact area sensor which captures an image (see, for example, Patent Document 1). As for a touch panel including an optical touch sensor, light is emitted from a touch panel. When an object exists at a predetermined position of the touch panel, light at the region where the object exists is blocked by the object, and part of the light is reflected. A photo sensor (also referred to as a photoelectric conversion element) which can detect light is provided in a pixel of the touch panel, and by detecting the reflected light, the photo sensor recognizes the existence of the object in the region where the light is detected.

In addition, it has been attempted to give a personal identification function etc. to an electronic device typified by a portable information terminal such as a mobile phone and the like (for example, see Patent Document 2). Identifications through a finger print, a face, a hand print, a palm print, a pattern of hand veins, and the like are used for personal identification. When the personal identification function is provided into a portion other than the display portion, the number of components increases, and the weight or price of the electronic device could increase.

In addition, in a touch sensor system, a technique to select an image processing mode to detect the position of a fingertip depending on the brightness of outside light is known (for example, see Patent Document 3).

REFERENCE

[Patent Document 1] Japanese Published Patent Application No. 2001-292276
[Patent Document 2] Japanese Published Patent Application No. 2002-033823
[Patent Document 3] Japanese Published Patent Application No. 2007-183706

DISCLOSURE OF INVENTION

When a photo sensor is used as an optical touch sensor in a touch panel, the photo sensor provided in each pixel of the touch panel detects light and generates an electric signal, and then, the electric signal is picked up, so that image processing is executed. Here, in order to realize a touch panel with high-accuracy and high-speed operation, it is necessary to efficiently collect a great deal of data obtained from a large number of photo sensors.

Further, since an electric signal generated by the photo sensor is an analog signal, a circuit (an A/D converter circuit) for converting an analog signal to a digital signal to execute image processing is necessary. In this case, the touch panel including a large number of A/D converter circuits needs a control method of operating the A/D converter circuits with high throughput.

Furthermore, since a large increase in a region necessary to realize the control method for the A/D converter circuits leads to an increase in a frame region, it is necessary to minimize as much as possible an increase in an area occupied by the circuit which relates to the control of the A/D converter circuit.

In view of the above problems, an object is to provide a touch panel with high-accuracy and high-speed operation. In addition, an object is to provide a driving method of a touch panel, which enables a high-performance and multi-level gray scale.

One embodiment of a structure of the present invention disclosed in this specification is a touch panel which includes a plurality of pixels each including a display element and a photo sensor, a photo sensor reading circuit to which an output signal of the photo sensor is provided, a plurality of latches provided in series, and a logic circuit. The logic circuit generates a signal by performing a logic operation on output signals of the plurality of latches and provides the generated signal to the photo sensor reading circuit.

Further, another embodiment of a structure of the present invention disclosed in this specification is a touch panel which includes a plurality of pixels each including a display element and a photo sensor, a photo sensor reading circuit to which an output signal of the photo sensor is provided, a display element select circuit which provides an image signal to the display element, a plurality of latches provided in series, and a logic circuit. The logic circuit generates a signal by performing a logic operation on output signals of the plurality of latches and provides the generated signal to the photo sensor reading circuit. The display element select circuit is controlled by output signals of the plurality of latches.

In the structure above, the display element select circuit includes a selector controlled by one of output signals of the plurality of latches, and the selector switches between connection and interruption of a path which provides the image signal to a display element.

Further in the structure above, the photo sensor reading circuit includes a plurality of A/D converter circuits and a reading circuit. An output signal of the photo sensor and a signal generated by the logic circuit are provided to one of the plurality of A/D converter circuits and output signals of the plurality of A/D converter circuits are provided to the reading circuit. The reading circuit selects and outputs one of the output signals of the plurality of A/D converter circuits.

Further, one of other embodiments of the structure of the present invention disclosed in this specification is a driving method of a touch panel in which output signals of the plurality of latches is provided to the logic circuit and the logic circuit generates a signal by performing a logic operation on the provided output signals and then, a signal output from the photo sensor and the signal generated by the logic circuit are input to the A/D converter circuits.

Further, one of other embodiments of a structure of the present invention disclosed in this specification is a driving method of a touch panel in which output signals of the plurality of latches is provided to the logic circuit and to the display element select circuit and the logic circuit generates a signal by performing a logic operation on the provided output signals and then, a signal output from the photo sensor and the signal generated by the logic circuit are input to the A/D converter circuit, and in the display element select circuit, a provision of an image signal to a display element is controlled by output signals provided by the plurality of latches.

In the structure above, the plurality of latches each provides an output signal to the logic circuit by sequentially shifting a start signal in synchronization with a clock signal.

In this manner, a touch panel with high-accuracy and high-speed operation can be provided. In addition, a driving method of a touch panel, which enables a high-performance and a multi-level gray scale can be provided.

BEST MODE FOR CARRYING OUT THE INVENTION

Figure 1:
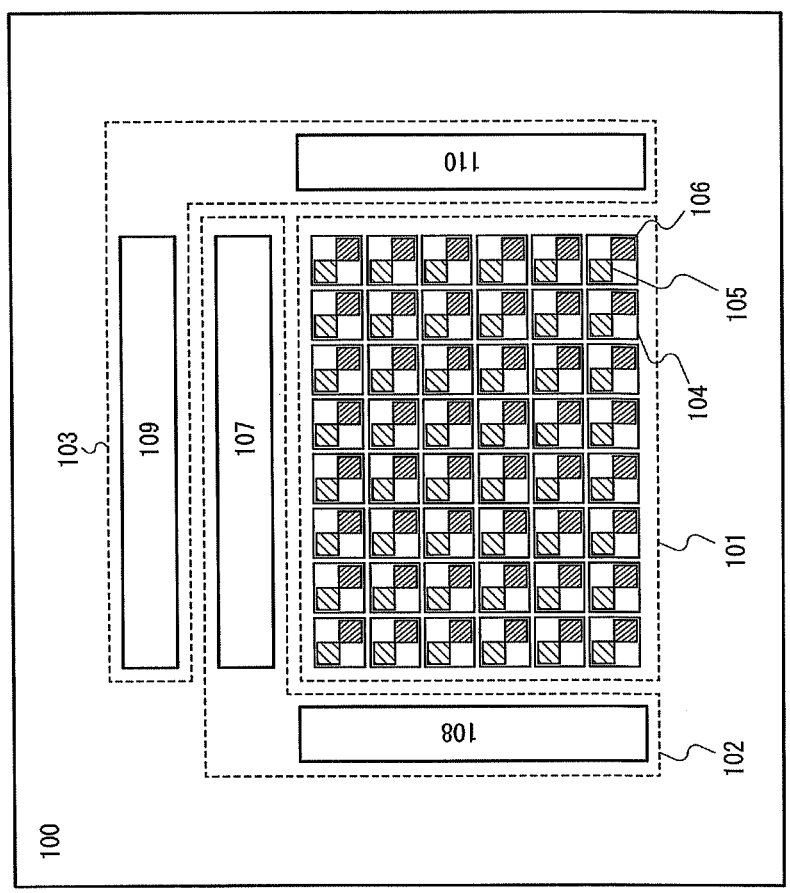
FIG. 1 illustrates an example of a structure of a touch panel.

Hereinafter, embodiments will be described in detail with reference to the accompanying drawings. However, since embodiments described below can be embodied in many different modes, it is easily understood by those skilled in the art that the mode and the detail can be variously changed without departing from the scope of the present invention. Therefore, the embodiments are not interpreted as being limited to the description of the embodiments below. Note that in all the drawings for describing the embodiments, like portions or portions having similar functions are denoted by the same reference numerals, and description thereof is not repeated.

Embodiment 1

In this embodiment, a touch panel is described.

FIG. 1 illustrates an example of the structure of the touch panel. In FIG. 1, a touch panel 100 includes a pixel circuit 101, a display element control circuit 102, and a photo sensor control circuit 103.

The pixel circuit 101 includes a plurality of pixels 104 arranged in a matrix of rows and columns Each of the pixels 104 includes a display element 105 and a photo sensor 106.

Each of the display elements 105 includes a thin film transistor (TFT), a storage capacitor, a liquid crystal element including a liquid crystal layer, a color filter, and the like. Taking advantage of the change in the direction of a polarization due to a voltage application to the liquid crystal layer, contrast (gray scale) of light passing through the liquid crystal layer is made, so that image display is realized. Outside light or light from the rear side of a liquid crystal display device, which is emitted by a light source (a backlight) is used as the light passing through the liquid crystal layer. Further, the light which has passed through the liquid crystal layer passes through a color filter, so that a gray scale of a particular color (for example, red (R), green (G), or blue (B)) can be produced and a color image display is realized. The storage capacitor has the function of storing charge equivalent to a voltage applied to the liquid crystal layer. The thin film transistor has the function of controlling an injection or ejection of the charge to/from the storage capacitor.

Note that the case where each of the display elements 105 includes a liquid crystal element is described above; however, other elements such as a light emitting element may be included instead. The light emitting element is an element in which the luminance is controlled by current or voltage. Specifically, light emitting diode, OLED (organic light emitting diode), and the like are given.

Each of the photo sensors 106 includes an element such as a photodiode, which has a function of generating an electric signal when receiving light. Note that as light which is received by the photo sensors 106, reflected light or transmitted light obtained when outside light or light from a backlight is shone on an object can be used. Here, the pixels 104 which emit light of colors of red (R), green (G), and blue (B) by using a color filter are called an B pixel, a G pixel, and a B pixel, respectively. Note that a red (R) color component, a green (G) color component, and a blue (B) color component in reflected light or transmitted light obtained when outside light or light from a backlight is shone on an object can be detected by photo sensors in an R pixel, a G pixel, and a B pixel, respectively.

The display element control circuit 102 controls the display elements 105 and includes a display element driver circuit 107, which inputs a signal to the display elements 105 through signal lines (also referred to as source signal lines), and a display element driver circuit 108 which inputs a signal to the display elements 105 through scanning lines (also referred to as gate signal lines). For example, the display element driver circuit 108 on the scanning line side has a function of selecting the display elements 105 included in the pixels placed in a particular line. Further, the display element driver circuit 107 on the signal line side has a function of giving a predetermined potential to the display elements 105 included in the pixels placed in the selected line. Note that in the display elements 105 to which the display element driver circuit 108 on the scanning line side applies high potential, the thin film transistors are conducting and charges given by the display element driver circuit 107 on the signal line side are provided to the display elements 105.

The photo sensor control circuit 103 controls the photo sensors 106 and includes a photo sensor reading circuit 109 on the signal line side and a photo sensor driver circuit 110 on the scanning line side. For example, the photo sensor driver circuit 110 on the scanning line side has a function of selecting the photo sensors included in the pixels placed in a predetermined line. Further, the photo sensor reading circuit 109 on the signal line side has a function of taking out an output signal of the photo sensors 106 included in the pixels in the selected line.

Figure 2:
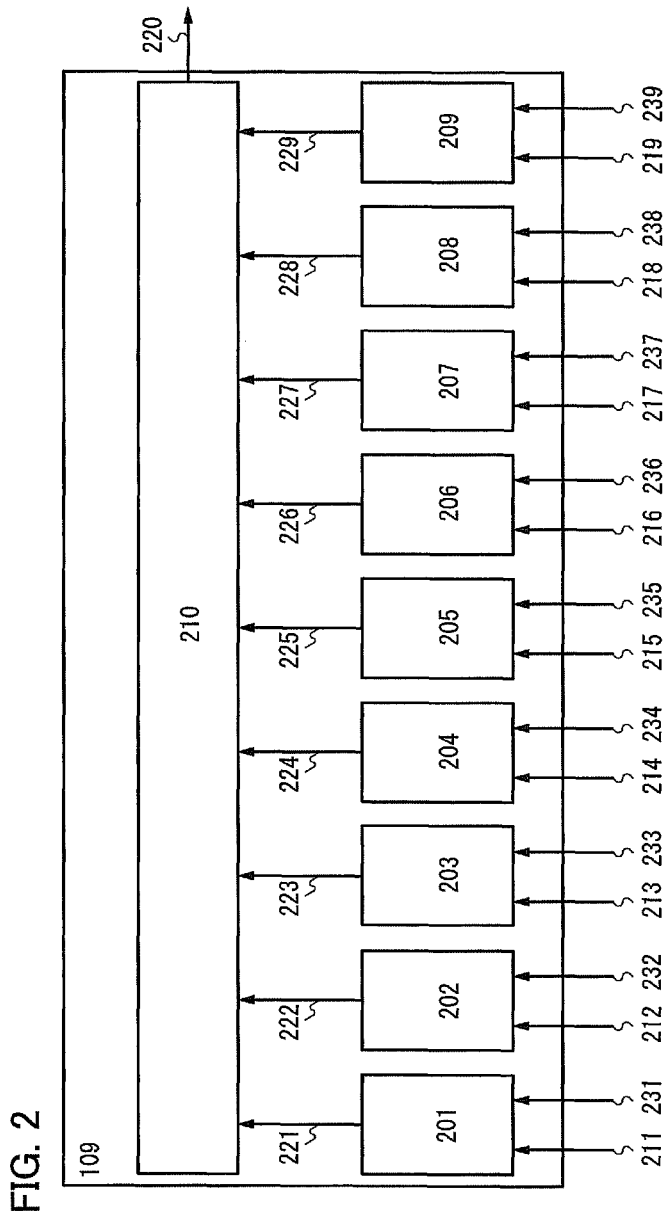
FIG. 2 illustrates an example of a structure of a photo sensor reading circuit.

FIG. 2 illustrates an example of the structure of the photo sensor reading circuit 109 on the signal line side.

FIG. 2 illustrates a 1st A/D converter circuit (analog-digital converter: ADC) 201 to a 9th A/D converter circuit 209, a reading circuit 210 to which signals output from the 1st A/D converter circuit 201 to the 9th A/D converter circuit 209 are input, a 1st photo sensor signal line 211 to a 9th photo sensor signal line 219, an output signal line 220 of the photo sensor reading circuit 109, an output signal line 221 of the 1st A/D converter circuit to an output signal line 229 of the 9th A/D converter circuit, and a control signal line 231 of the 1st A/D converter circuit to a control signal line 239 of the 9th A/D converter circuit.

Output signals of the photo sensors are input to the 1st A/D converter circuit 201 to the 9th A/D converter circuit 209 through the 1st photo sensor signal line 211 to the 9th photo sensor signal line 219, respectively. Further, signals for controlling the 1st A/D converter circuit 201 to the 9th A/D converter circuit 209 are input through the 1st control signal line 231 to the 9th control signal line 239, respectively.

The reading circuit 210 generates a potential, which is output to the output signal line 220, from each of the potentials of the 1st output signal line 221 to the 9th output signal line 229. Specifically, the reading circuit 210 selects one of the 1st output signal line 221 to the 9th output signal line 229, and then, outputs the potential of the selected signal line to the output signal line 220.

Figure 3:
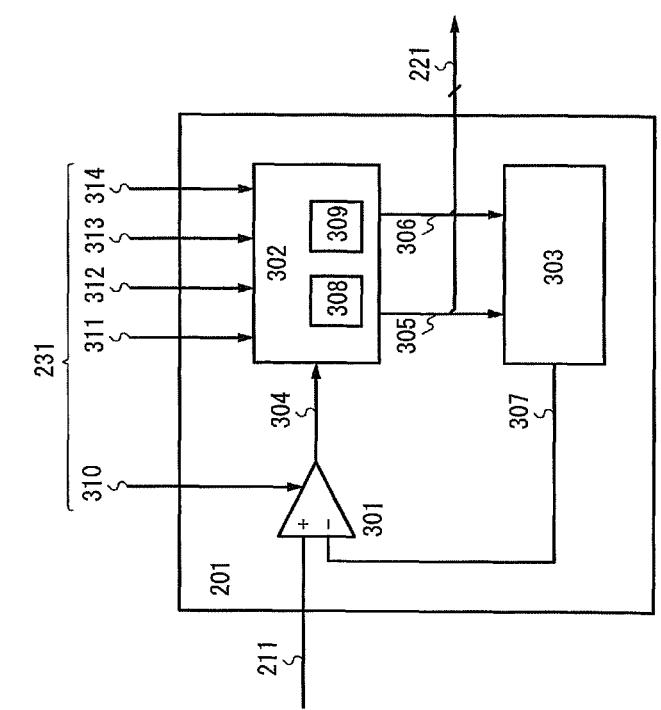
FIG. 3 illustrates an example of a structure of an A/D converter circuit.

FIG. 3 illustrates an example of the structure of the A/D converter circuit 201. In this case, a 2-bit successive approximation A/D converter circuit is used as an example.

In FIG. 3, the A/D converter circuit 201 includes a comparator circuit (comparator) 301, a successive approximation register 302, a D/A converter circuit (digital-analog converter) 303, an output signal line 304 of the comparator circuit 301, a 1st output signal line 305 and a 2nd output signal line 306 of the successive approximation register 302, an output signal line 307 of the D/A converter circuit 303, a 1st holding circuit 308, and a 2nd holding circuit 309. Further, FIG. 3 illustrates an enable signal line 310, a 1st reset signal line 311, a 2nd reset signal line 312, a 1st set signal line 313, and a 2nd set signal line 314, which are included in the A/D converter circuit. The enable signal line 310, the 1st reset signal line 311, the 2nd reset signal line 312, the 1st set signal line 313, and the 2nd set signal line 314, which are included in the A/D converter circuit, are collectively called a control signal line 231 of the A/D converter circuit. The 1st output signal line 305 and the 2nd output signal line 306 of the successive approximation register 302 are electrically connected to the output signal line 221 of the A/D converter circuit. In this case, the output signal line 221 of the A/D converter circuit is a 2-bit signal line.

Next, an example of the operation of the A/D converter circuit 201 illustrated in FIG. 3 is described.

The comparator circuit 301 uses the photo sensor signal line 211 and the output signal line 307 of the D/A converter circuit 303 as input signal lines and compares potentials of both of the signal lines and then, outputs a high-level potential or a low level potential to the output signal line 304 according to the result of the comparison. Here, when a potential of the photo sensor signal line 211 is higher than that of the output signal line 307 of the D/A converter circuit 303, a high-level potential is output, and when a potential of the photo sensor signal line 211 is lower than that of the output signal line 307 of the D/A converter circuit 303, a low-level potential is output. In addition, the operation of the comparator circuit 301 can be started or stopped by controlling a potential of the enable signal line 310. While the comparator circuit 301 does not operate, power consumption in the comparator circuit 301 can be significantly reduced. This can be realized, for example, by halting the supply of power voltage to the comparator circuit 301. Here, when the enable signal line 310 is high, the comparator circuit 301 operates, and when the enable signal line 310 is low, the comparator circuit 301 does not operate.

In the successive approximation register 302, the 1st holding circuit 308 holds a potential, which corresponds to a potential of the output signal line 304 of the comparator circuit 301, by control of potential of the 1st set signal line 313; the 2nd holding circuit 309 holds a potential, which corresponds to a potential of the output signal line 304 of the comparator circuit 301, by control of a potential of the 2nd set signal line 314; a potential held in the 1st holding circuit 308 and a potential held in the 2nd holding circuit 309 can be reset by control of a potential of the 1st reset signal line 311; and a potential held in the 2nd holding circuit 309 can be reset by control of a potential of the 2nd reset signal line 312.

Each of the 1st holding circuit 308 and the 2nd holding circuit 309 can be formed using a level sensitive latch, an edge sensitive latch, or the like. Here, the 1st holding circuit 308 (or the 2nd holding circuit 309) has a level sensitive latch. When the 1st set signal line 313 (or the 2nd set signal line 314) is high, if the output signal line 304 of the comparator circuit 301 is high, the 1st holding circuit 308 (or the 2nd holding circuit 309) is held high, and if the output signal line 304 of the comparator circuit 301 is low, the 1st holding circuit 308 (or the 2nd holding circuit 309) is held low. Note that the 1st holding circuit 308 is held high and the 2nd holding circuit 309 is held low when the 1st reset signal line 311 is high, and the 2nd holding circuit 309 is held high when the 2nd reset signal line 312 is high.

In addition, in the successive approximation register 302, a potential held in the 1st holding circuit 308 and a potential held in the 2nd holding circuit 309 are output to the 1st output signal line 305 and the 2nd output signal line 306 of the successive approximation register 302, respectively.

The D/A converter circuit 303 outputs a potential determined uniquely by a potential of the 1st output signal line 305 and a potential of the 2nd output signal line 306 of the successive approximation register 302 to the output signal line 307 of the D/A converter circuit 303. Here, when the combination of a potential of the 1st output signal line 305 and a potential of the 2nd output signal line 306, which are in the successive approximation register 302, is (low, low), (low, high), (high, low), or (high, high), 0 V, 1 V, 2 V, or 3 V, respectively, is output to the output signal line 307 of the D/A converter circuit 303. Such a D/A converter circuit 303 can be realized by a resistance method or a capacitance method.

Next, an example of the operation of the A/D converter circuit 201 is described with reference to a timing chart in FIG. 4.

Figure 4:
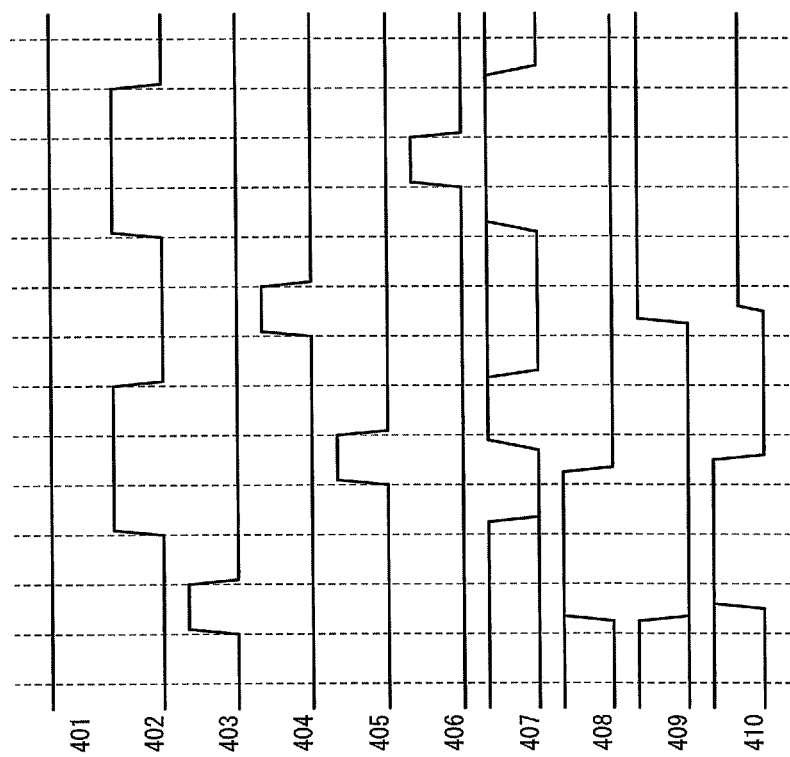
FIG. 4 is a timing chart illustrating an example of the operation of an A/D converter circuit.

In FIG. 4, a signal 401 to a signal 410 correspond to potentials of the photo sensor signal line 211, the enable signal line 310, the 1st reset signal line 311, the 2nd reset signal line 312, the 1st set signal line 313, the 2nd set signal line 314, the output signal line 304 of the comparator circuit 301, the 1st output signal line 305 of the successive approximation register 302, the 2nd output signal line 306 of the successive approximation register 302, and the output signal line 307 of the D/A converter circuit 303, respectively. Note that a potential of the photo sensor signal line 211 (the signal 401) is 1.5V.

The A/D converter circuit 201 operates in the following manner. First, if the 1st reset signal line 311 (the signal 403) is set to be high, a potential held in the 1st holding circuit 308 and a potential held in the 2nd holding circuit 309 are reset and the 1st output signal line 305 (the signal 408) of the successive approximation register 302 goes high and the 2nd output signal line 306 (the signal 409) of the successive approximation register 302 goes low. Further, a potential of the output signal line 307 (the signal 410) of the D/A converter circuit 303 goes to 2V.

Next, the enable signal line 310 (the signal 402) is set to be high, so that the comparator circuit 301 operates and compares a potential (1.5V) of the photo sensor signal line 211 (the signal 401) with a potential (2V) of the output signal line 307 (the signal 410) of the D/A converter circuit 303. Then, since the potential of the output signal line 307 (the signal 410) of the D/A converter circuit 303 is higher, the output signal line 304 (the signal 407) of the comparator circuit 301 goes low.

Next, the 1st set signal line 313 (the signal 405) is set to be high, so that the 1st holding circuit 308 is held low and the 1st output signal line 305 (the signal 408) of the successive approximation register 302 goes low. Further, a potential of the output signal line 307 (the signal 410) of the D/A converter circuit 303 goes to 0V. Then, a potential (1.5V) of the photo sensor signal line 211 (the signal 401) is compared with a potential of the output signal line 307 (the signal 410) of the D/A converter circuit 303. Since the potential (0V) of the output signal line 307 (the signal 410) of the D/A converter circuit 303 is lower, the output signal line 304 (the signal 407) of the comparator circuit 301 goes high.

Then, the enable signal line 310 (the signal 402) is set to be low, so that the comparator circuit 301 stops operating.

Next, the 2nd reset signal line 312 (the signal 404) is set to be high, so that a potential held in the 2nd holding circuit 309 is reset, and the 2nd output signal line 306 (the signal 409) of the successive approximation register 302 goes high. Further, a potential of the output signal line 307 (the signal 410) of the D/A converter circuit 303 goes to 1V.

Then, the enable signal line 310 (the signal 402) is set to be high, so that the comparator circuit 301 operates and compares a potential (1.5V) of the photo sensor signal line 211 (the signal 401) with a potential (1V) of the output signal line 307 (the signal 410) of the D/A converter circuit 303. Since the potential of the output signal line 307 (the signal 410) of the D/A converter circuit 303 is lower, the output signal line 304 (the signal 407) of the comparator circuit 301 goes high.

Next, the 2nd set signal line 314 (the signal 406) is set to be high, so that the 2nd holding circuit 309 is held high. Here, since the 2nd holding circuit 309 is held high from the beginning, the 2nd output signal line 306 (the signal 409) of the successive approximation register 302 remains high without changing. Further, the output signal line 307 (the signal 410) of the D/A converter circuit 303 is 1V without changing.

In this manner, a low-level potential or a high-level potential is output as A/D converter data from the output signal line 221 of the A/D converter circuit.

As described above, in the A/D converter circuit with the successive approximation method, an output of the D/A converter circuit is successively changed by changing a potential held in the holding circuit included in the successive approximation register and then, the output of the D/A converter circuit is compared with a potential to be measured so that an output signal is determined. Although a 2-bit A/D converter circuit is described here, an A/D converter circuit using a greater number of bits can operate with a similar method.

Embodiment 2

In FIG. 2 of Embodiment 1, the photo sensor reading circuit 109 on the signal line side outputs signals, which have been converted in the 1st A/D converter circuit 201 to the 9th A/D converter circuit 209, from the output signal line 220.

Here, signals obtained by A/D conversion are not output at the same time but preferably output in time sequence from the output signal line 220. This is because if the signals are output at the same time from the output signal line 220, the number of the signal line 220 increases; thus, when signals are taken from the touch panel, the signals are extremely complicated.

Then, in this embodiment, the operation of the A/D converter circuits in the case where signals obtained by A/D conversion are output in time sequence is described.

When the signals obtained by A/D conversion are output in time sequence, the signals from the output signal line 220 are output with time differences. On the other hand, A/D conversion in the 1st A/D converter circuit 201 to the 9th A/D converter circuit 209 needs to have been performed by the time the signal is output from the output signal line 220.

Then, a structure designed to perform A/D conversion in the 1st A/D converter circuit 201 to the 9th A/D converter circuit 209 not at the same time but in time sequence is described below.

Figure 5:
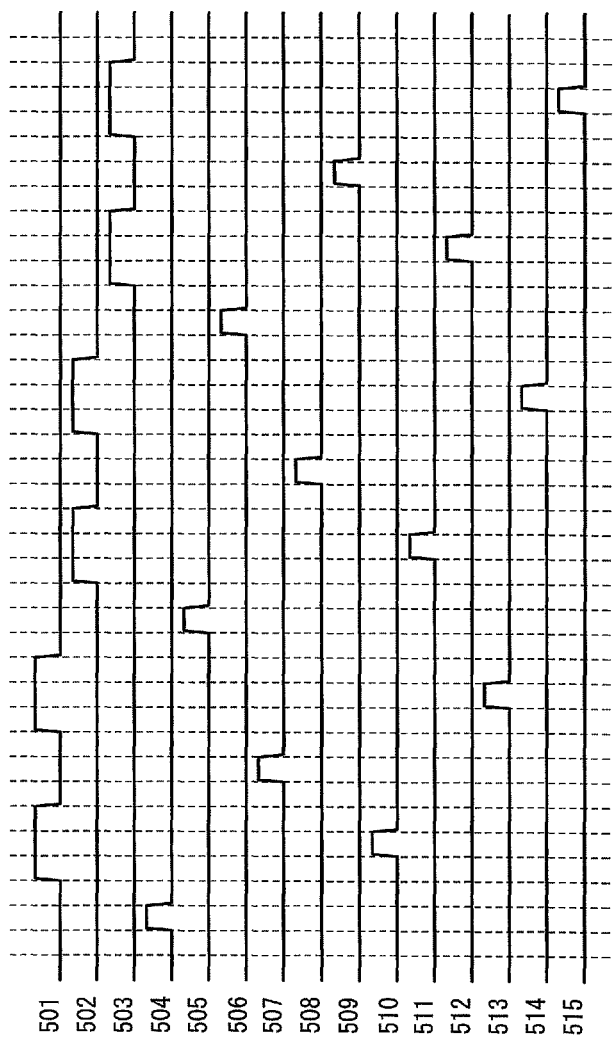
FIG. 5 is a timing chart illustrating an example of operation of A/D converter circuits.

An example of the operation of the A/D converter circuits is described with reference to a timing chart in FIG. 5. In FIG. 5, a signal 501 to a signal 515 correspond to potentials of the enable signal lines of the 1st A/D converter circuit 201 to the 3rd A/D converter circuit 203, potentials of the 1st reset signal lines of the 1st A/D converter circuit 201 to the 3rd A/D converter circuit 203, potentials of the 2nd reset signal lines of the 1st A/D converter circuit 201 to the 3rd A/D converter circuit 203, potentials of the 1st set signal lines of the 1st A/D converter circuit 201 to the 3rd A/D converter circuit 203, and potentials of the 2nd set signal lines of the 1st A/D converter circuit 201 to the 3rd A/D converter circuit 203, which are in FIG. 2, respectively.

Note that FIG. 5 illustrates a timing chart of the potential of each signal line of the 1st A/D converter circuit 201 to the 3rd A/D converter circuit 203; however, when shifted in the time-axis direction, a timing chart of the potential of each signal line of the 4th A/D converter circuit 204 to the 9th A/D converter circuit 209 is obtained in a similar way.

In addition, as described with reference to FIG. 4, the 1st A/D converter circuit 201 operates with the signals 501, 504, 507, 510, and 513. In a similar way, the 2nd A/D converter circuit 202 operates with the signals 502, 505, 508, 511, and 514. Further, the 3rd A/D converter circuit 203 operates with the signals 503, 506, 509, 512, and 515.

Here, a feature of the enable signal line (the signal 501) of the 1st A/D converter circuit 201 to the enable signal line (the signal 503) of the 3rd A/D converter circuit 203 is that periods in which the enable signal lines go high, that is, periods in which the comparator circuits in the A/D converter circuit 201 to the A/D converter circuit 203 operate do not overlap with each other.

If the A/D converter circuits operate at the same time, and then the comparator circuits operate at the same time, the A/D converter circuits consume a significant amount of power instantaneously. On the other hand, as described with reference to the timing chart in FIG. 5, when the A/D converter circuits operate in time sequence, fewer comparator circuits operate at the same time, so that the rise in the instantaneous power consumption in the A/D converter circuits can be reduced.

In addition, in general, there is a trade-off between power consumption in an A/D converter circuit and A/D conversion accuracy (voltage resolution or gray scale) and between power consumption in an A/D converter circuit and A/D conversion speed. Therefore, the A/D converter circuits can operate at high speed with high accuracy because the rise in the instantaneous power consumption is reduced.

Further, when A/D conversion in each A/D converter circuit and signal output of the output signal line are performed with an assembly-line method (a pipeline processing), length of time in which each A/D converter circuit performs A/D conversion can be extended, that is, relatively speaking, the speed of A/D conversion can be improved.

Embodiment 3

The operation of the A/D converter circuits, which is described in Embodiment 1, is controlled by providing each of control signals (also referred to as timing signals) of the A/D converter circuits. As a method of providing signals to the A/D converter circuits, a method of providing the signals from an external driving circuit through a timing signal line or a method of providing the signals from a timing signal generator circuit included in the touch panel through the timing signal line are given. Here, the number of timing signal lines is proportional to the number of A/D converter circuits and to the number of bits of each A/D converter circuit.

In the case where timing signals are provided from the external driving circuit, a large number of timing signal lines are led out from the touch panel. When the number of timing signal lines increases, an area for leading the timing signal lines increases, so that a frame region increases. Further, a difficulty occurs in an electric connection between each of timing signal lines and the external driving circuit.

Furthermore, the method of providing timing signals from the external driving circuit is extremely disadvantageous for higher performance of the touch panel such as improvement in spatial resolution or in number of gray scale levels. For example, in order to improve the spatial resolution of the touch panel, it is necessary to increase the number of A/D converter circuits, so that the number of timing signal lines increases. Moreover, in order to improve the number of gray scale levels of the touch panel, it is necessary to increase the number of bits of each A/D converter circuit, so that the number of timing signal lines increases.

On the other hand, in the case where timing signals are provided from the timing signal generator circuit included in the touch panel, the timing signal lines can be connected to the timing signal generator circuit over the touch panel; therefore, the problem caused by the increase in number of timing signal lines is alleviated compared with the case where timing signals are provided from the external driving circuit.

Here, for the timing signal generator circuit, a structure with a CPU or a structure with a dedicated circuit is given.

In general, in the case of using a CPU, a change to the specification of a timing signal is enabled by changing a program loaded in a memory; however, a layout area for the memory extremely increases. Since a region provided with the CPU and with the memory is a frame region, a quality of display is reduced when a layout area for the memory increases. In addition, in the case of using a dedicated circuit to realize a particular function, a circuit size can be reduced compared with the case of using a CPU, so that the layout area can be reduced. However, unless the layout is created considering an arrangement over the panel, the frame region increases and the quality of display is reduced, and further, the device is upsized.

Then, in this embodiment, a timing signal generator circuit is described which is included in the touch panel to allow timing signals to be provided to the A/D converter circuits. Specifically, a timing signal generator circuit is hereinafter described which includes a shift register and a logic circuit.

Figure 6:
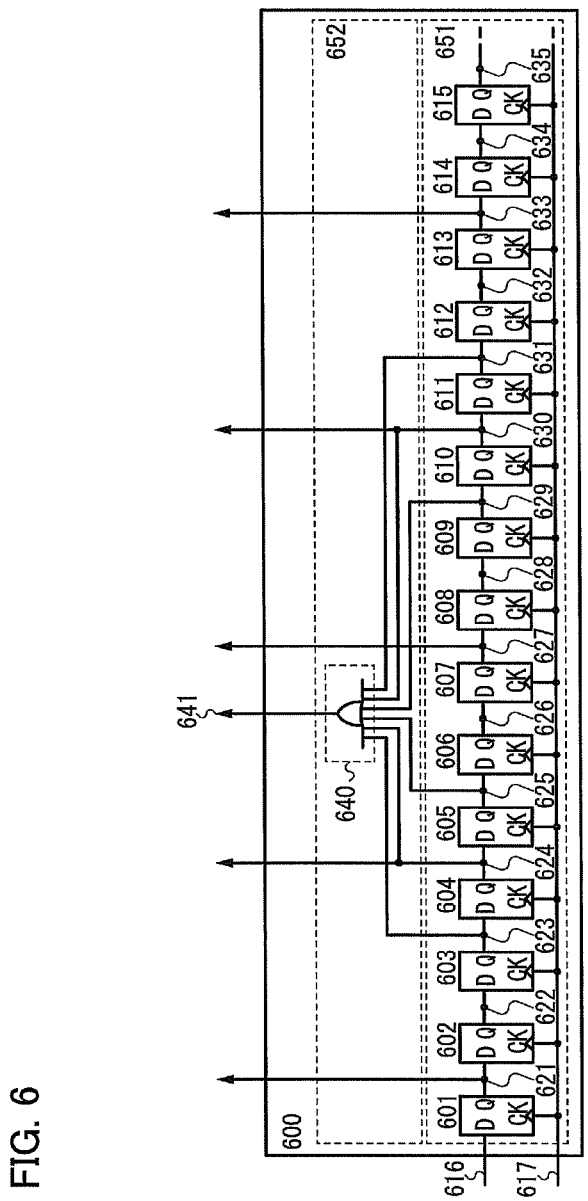
FIG. 6 illustrates an example of a structure of a timing signal generator circuit.

FIG. 6 illustrates an example of the structure of a timing signal generator circuit. In FIG. 6, a timing signal generator circuit 600 includes a shift register 651 and a logic circuit 652. The shift register 651 includes a 1st edge sensitive latch 601 to a 15th edge sensitive latch 615. The logic circuit 652 includes an OR circuit 640. As for each of the edge sensitive latches, a held potential is output from a Q terminal, and when a CK terminal changes from low to high, a potential of the edge sensitive latch is changed into that of a D terminal. Note that in FIG. 6, edge sensitive latches are used as the latches included in the shift register 651; however, this embodiment is not limited to this example: level sensitive latches can also be employed as the latches.

In the shift register 651, a start signal provided from a start signal line 616 are synchronized with a clock signal provided from a clock signal line 617 and shifts sequentially from the 1st edge sensitive latch 601 to the 15th edge sensitive latch 615. Output signals of the 1st edge sensitive latch 601 to the 15th edge sensitive latch 615 are provided to a 1st output signal line 621 to the 15th output signal line 635, respectively.

The logic circuit 652 generates a signal, which is provided to a 16th output signal line 641, from signals provided from the 1st output signal line 621 to the 15th output signal line 635. More specifically, the OR circuit 640 performs logic operation on input signals, that is, signals output from the 3rd output signal line 623 to the 5th output signal line 625 and signals output from the 9th output signal line 629 to the 11th output signal line 631, and generates a signal. Then, the OR circuit outputs the generated signal to the 16th output signal line 641. Note that the OR circuit is used as a logic circuit which performs logic operation in FIG. 6; however, this embodiment is not limited to this.

Note that the shift register including fifteen edge sensitive latches is described with reference to FIG. 6; however, the number of edge sensitive latches is not limited to that in the structure in FIG. 6. The shift register can easily be made to have m (m is a natural number) edge sensitive latches.

Figure 7:
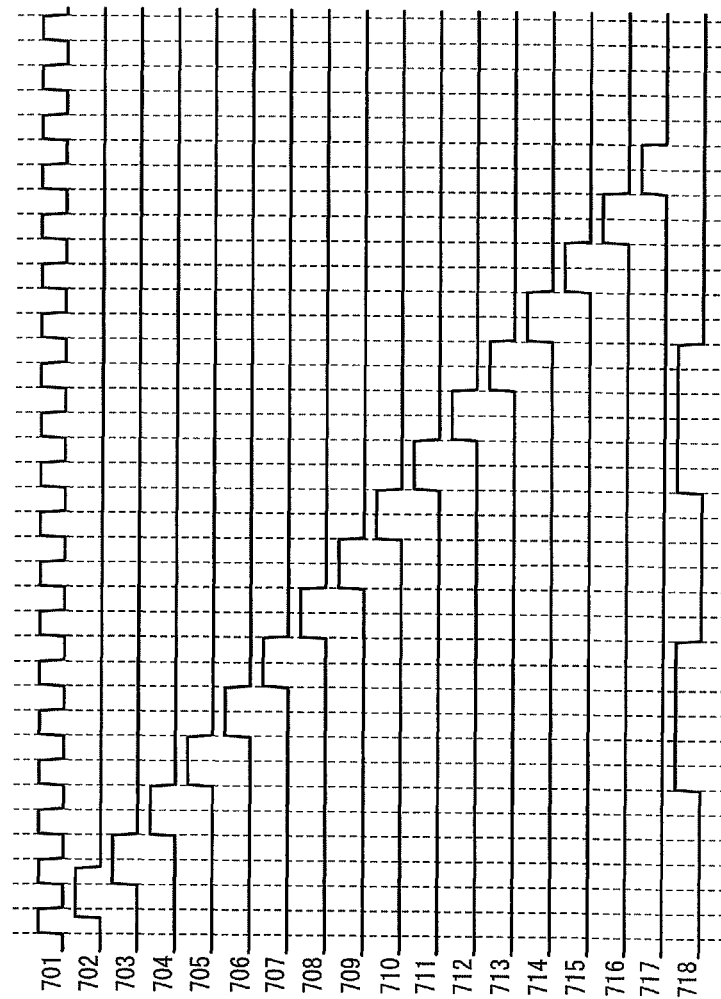
FIG. 7 is a timing chart illustrating an example of operation of a timing signal generator circuit.

Next, a timing chart of the timing signal generator circuit is described. FIG. 7 illustrates a timing chart showing an example of the operation of the timing signal generator circuit 600.

In FIG. 7, a signal 701 to a signal 718 correspond to potentials of the clock signal line 617, the start signal line 616, the 1st output signal line 621 to the 15th output signal line 635, and the 16th output signal line 641, respectively.

When the clock signal line 617 (the signal 701) changes from low to high, the 1st edge sensitive latch 601 takes a potential of the start signal line 616 (the signal 702) and changes a potential of the 1st output signal line 621 (the signal 703). The 2nd edge sensitive latch 602 to the 15th edge sensitive latch 615 changes potentials of the 2nd output signal line 622 (the signal 704) to the 15th output signal line 635 (the signal 717), respectively, with a delay of one clock period. Further, the 16th output signal line 641 (the signal 718) goes high, when any of potentials of the 3rd output signal line 623 to the 5th output signal line 625 and the 9th output signal line 629 to the 11th output signal line 631 is high.

In FIG. 6, the timing chart illustrated in FIG. 5 can be realized by regarding the 16th output signal line 641, the 1st output signal line 621, the 7th output signal line 627, the 4th output signal line 624, the 10th output signal line 630, and the 13th output signal line 633 as the enable signal line 310, the 1st reset signal line 311, the 2nd reset signal line 312, the 1st set signal line 313, and the 2nd set signal line 314 which are included in the 1st A/D converter circuit 201, and the 1st reset signal line 311 which is included in the 2nd A/D converter circuit 202, respectively.

Note that in FIG. 6, the case of obtaining potentials which is output to the enable signal line 310, the 1st reset signal line 311, the 2nd reset signal line 312, the 1st set signal line 313, and the 2nd set signal line 314 which are included in the 1st A/D converter circuit 201 illustrated in FIG. 3, and to the 1st reset signal line 311 which is included in the 2nd A/D converter circuit 202 is shown. In a similar way, it is possible to obtain potentials which are output to enable signal lines of the 2nd A/D converter circuit 202 to the 9th A/D converter circuit 209, 1st reset signal lines of the 3rd A/D converter circuit 203 to the 9th A/D converter circuit 209, 2nd reset signal lines of the 2nd A/D converter circuit 202 to the 9th A/D converter circuit 209, 1st set signal lines of the 2nd A/D converter circuit 202 to the 9th A/D converter circuit 209, and 2nd set signal lines of the 2nd A/D converter circuit 202 to the 9th A/D converter circuit 209 by further extending the shift register 651 and obtaining signals as appropriate.

Next, a structure in which the photo sensor reading circuit 109 on the signal line side, which is illustrated in FIG. 2, is combined with the timing signal generator circuit 600 illustrated in FIG. 6 is described. Specifically, an example of the structure in which the timing signal generator circuit 600 is provided in the photo sensor reading circuit 109 on the signal line side is described with reference to FIG. 8.

In FIG. 6, the 16th output signal line 641, the 1st output signal line 621, the 7th output signal line 627, the 4th output signal line 624, the 10th output signal line 630, and the 13th output signal line 633 correspond to the enable signal line 310, the 1st reset signal line 311, the 2nd reset signal line 312, the 1st set signal line 313, the 2nd set signal line 314 which are included in the 1st A/D converter circuit 201 in FIG. 3, and to the 1st reset signal line 311 which is included in the 2nd A/D converter circuit 202, respectively. The enable signal line 310, the 1st reset signal line 311, the 2nd reset signal line 312, the 1st set signal line 313, and the 2nd set signal line 314, which are included in the 1st A/D converter circuit 201, are collectively regarded as the control signal line 231 of the 1st A/D converter circuit 201 in FIG. 8.

Figure 8:
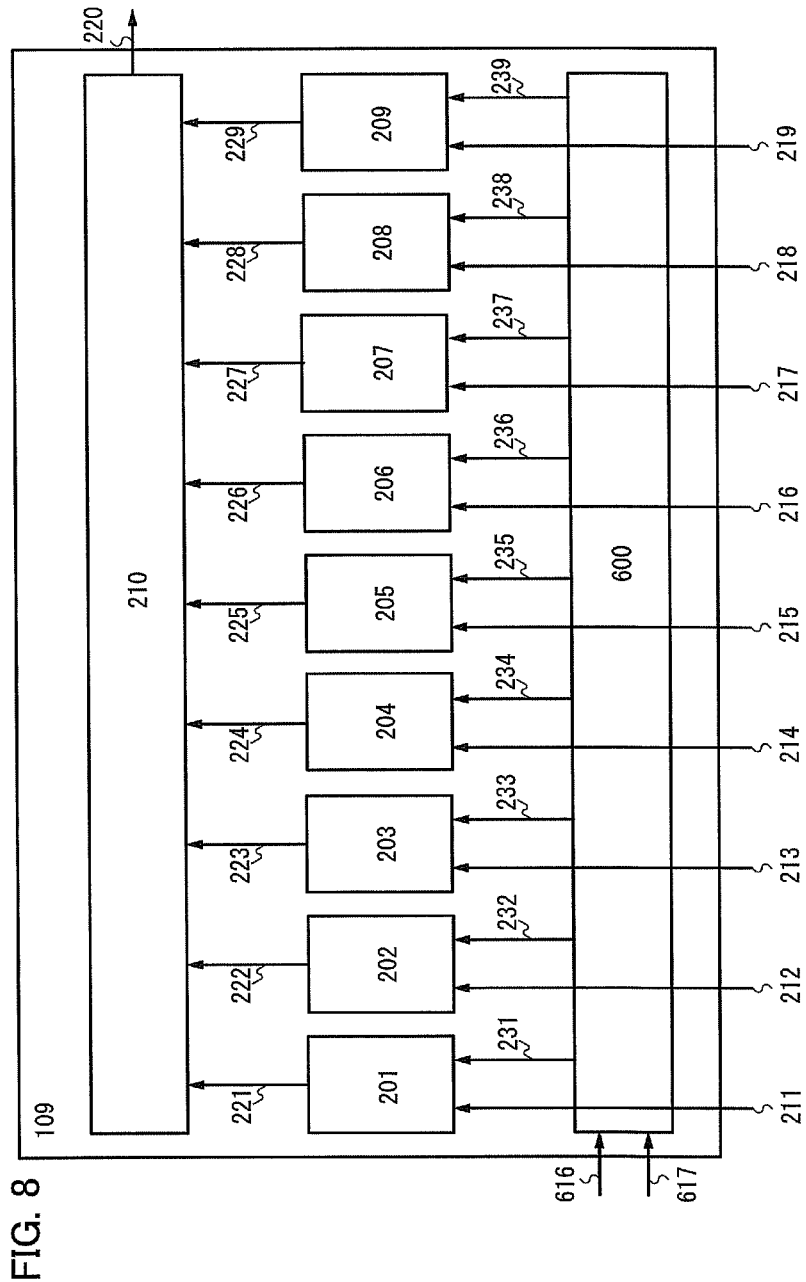
FIG. 8 illustrates an example of a structure of a photo sensor reading circuit.

Moreover, in a similar way, by further extending the shift register 651 in the timing signal generator circuit 600 and obtaining signals as appropriate, it is possible to obtain potentials which are output to enable signal lines of the 2nd A/D converter circuit 202 to the 9th A/D converter circuit 209, 1st reset signal lines of the 3rd A/D converter circuit 203 to the 9th A/D converter circuit 209, 2nd reset signal lines of the 2nd A/D converter circuit 202 to the 9th A/D converter circuit 209, 1st set signal lines of the 2nd A/D converter circuit 202 to the 9th A/D converter circuit 209, and 2nd set signal lines of the 2nd A/D converter circuit 202 to the 9th A/D converter circuit 209 and it is possible to obtain potentials of the control signal line 232 of the 2nd A/D converter circuit 202 and the control signal line 239 of the 9th A/D converter circuit 209 which are in FIG. 8.

Note that for the shift register 651 included in the timing signal generator circuit 600, a structure in which a plurality of edge sensitive latches is placed in series in the column direction in the touch panel is effective. With this structure, the increase in a frame region can be restrained.

Here, the fact that the structure of the timing signal generator circuit 600 in FIG. 6 is effective for higher performance of the touch panel such as improvement in spatial resolution or in number of gray scale levels is described.

In the structure in FIG. 8, in order to improve spatial resolution of the touch panel, the number of A/D converter circuits increases in the column direction; however, in the timing signal generator circuit 600, an increase in number of stages of the shift register 651 in the column direction can allow the improvement. Here, an area required for the increase in number of stages of shift register is much smaller than an area required for leading wirings for the structure where an external driving circuit is provided. Accordingly, the structure in FIG. 8 can restrain an increase in layout area. Note that in the structure in FIG. 8, the number of signal lines for inputting signals from an external portion to the touch panel does not increase even when the number of stages of the shift register 651 increases.

In addition, in the structure in FIG. 8, in order to improve the number of gray scale levels of the touch panel, the number of bits of each A/D converter circuit increases; however, in the timing signal generator circuit 600, the improvement is realized by increasing the number of stages of the shift register 651 in the column direction and adding logic element circuits to the logic circuit 652 as appropriate. Here, as a logic element circuit, a NOT circuit, an OR circuit, an AND circuit, an XOR circuit, a NOR circuit, a NAND circuit, an XNOR circuit, or the like is used.

In addition, in general, a layout area for a logic element circuit is smaller than that for a shift register. Therefore, in the structure in FIG. 8, the increase in layout area for the logic circuit 652 due to the addition of the logic element circuit has little influence on an increase in layout area for the whole timing signal generator circuit 600. Accordingly, the increase in number of stages of the shift register 651 can be realized while the increase in layout area is restrained at the same time.

With the structure described above, a touch panel with a high spatial resolution and a large number of gray scale levels, which is restrained from increasing in the frame region and is good in the quality of display, can be obtained.

Embodiment 4

The structure of the timing signal generator circuit is described in Embodiment 3. In connection with this, the shift register in the timing signal generator circuit can be shared with a shift register included in the display element driver circuit 107 which is provided on the signal line side for an image drawing of the touch panel.

In this embodiment, a timing signal generator circuit which is included in the touch panel and shares a shift register with the display element driver circuit on the signal line side is described.

Figure 9:
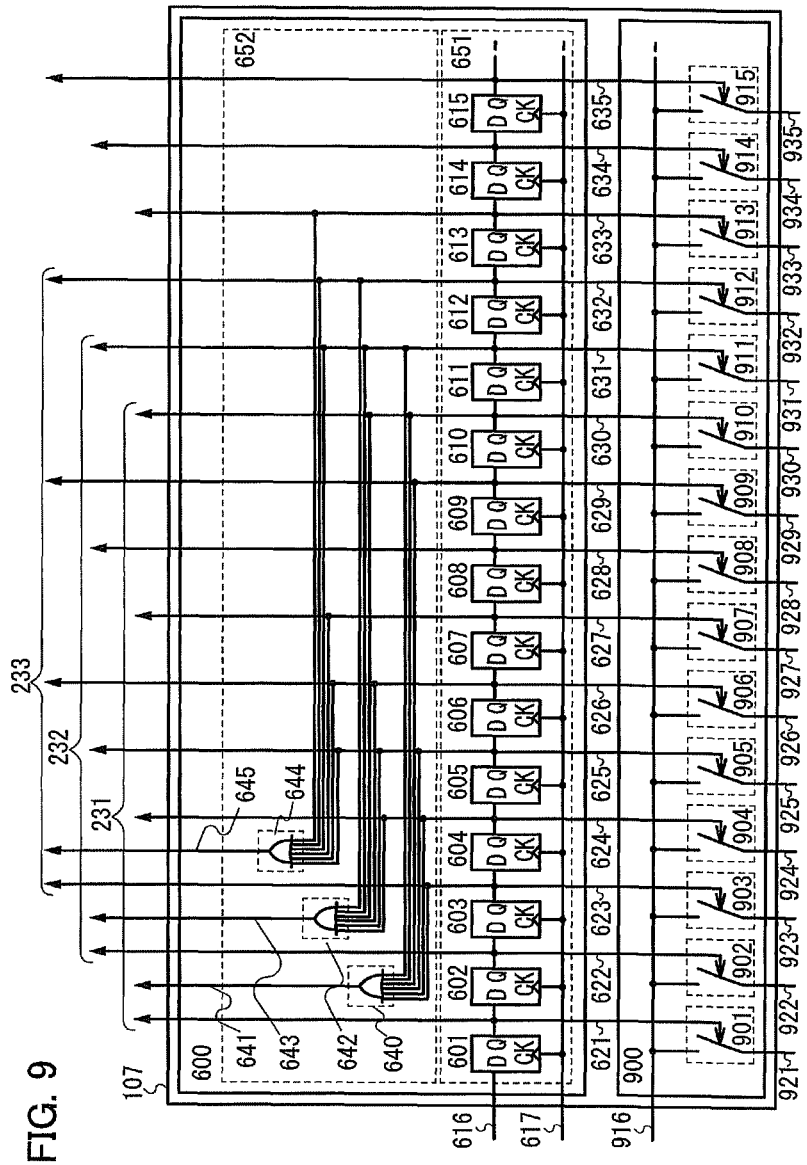
FIG. 9 illustrates an example of a structure of a display element driver circuit.

In FIG. 9, an example of the structure of the display element driver circuit 107 which is provided on the signal line side and includes the timing signal generator circuit 600 and a display element select circuit 900 is described. In FIG. 9, the display element select circuit 900 includes a 1st selector 901 to a 15th selector 915. The 1st selector 901 is controlled by the 1st output signal line 621 included in the timing signal generator circuit 600, and switches between connection and interruption of a path which provides an image signal provided from an image signal input line 916 to a 1st source signal line 921. In a similar way, the 2nd selector 902 to the 15th selector 915 are controlled by a 2nd output signal line 622 to a 15th output signal line 635, which are included in the timing signal generator circuit 600, respectively, and switch between connection and interruption of paths which provide image signals provided from the image signal input line 916 to a 2nd source signal line 922 to a 15th source signal line 935.

The logic circuit 652 in the timing signal generator circuit 600 includes a 1st OR circuit 640, a 2nd OR circuit 642, and a 3rd OR circuit 644. The 1st OR circuit 640 performs logic operation on signals output from the 3rd output signal line 623 to the 5th output signal line 625 and signals output from the 9th output signal line 629 to the 11th output signal line 631, which are included in the timing signal generator circuit 600, and generates a signal and then, outputs the signal to the 16th output signal line 641. In a similar way, the 2nd OR circuit 642 performs logic operation on signals output from the 4th output signal line 624 to the 6th output signal line 626 and signals output from the 10th output signal line 630 to the 12th output signal line 632, which are included in the timing signal generator circuit 600, and generates a signal and then, outputs the signal to a 17th output signal line 643. Further, the 3rd OR circuit 644 performs logic operation on signals output from the 5th output signal line 625 to the 7th output signal line 627 and signals output from the 11th output signal line 631 to the 13th output signal line 633, which are included in the timing signal generator circuit 600, and generates a signal and then, outputs the signal to a 18th output signal line 645. Note that an OR circuit is used as a logic circuit for the logic operation in FIG. 9; however, this embodiment is not limited to this.

Here, in the timing signal generator circuit 600, the 16th output signal line 641, the 1st output signal line 621, the 7th output signal line 627, the 4th output signal line 624, and the 10th output signal line 630 may correspond to the enable signal line 310, the 1st reset signal line 311, the 2nd reset signal line 312, the 1st set signal line 313, and the 2nd set signal line 314, which are included in the 1st A/D converter circuit 201 in FIG. 3, respectively. Those signal lines are collectively regarded as the control signal line 231 of the 1st A/D converter circuit 201 in FIG. 2.

In a similar way, in the timing signal generator circuit 600, the 17th output signal line 643, the 2nd output signal line 622, the 8th output signal line 628, the 5th output signal line 625, and the 11th output signal line 631 may correspond to the enable signal line 310, the 1st reset signal line 311, the 2nd reset signal line 312, the 1st set signal line 313, and the 2nd set signal line 314, which are included in the 2nd A/D converter circuit 202 in FIG. 3, respectively. Those signal lines are collectively regarded as the control signal line 232 of the 2nd A/D converter circuit 202 in FIG. 2.

Further, in the timing signal generator circuit 600, the 18th output signal line 645, the 3rd output signal line 623, the 9th output signal line 629, the 6th output signal line 626, and the 12th output signal line 632 may correspond to the enable signal line 310, the 1st reset signal line 311, the 2nd reset signal line 312, the 1st set signal line 313, and the 2nd set signal line 314, which are included in the 3rd A/D converter circuit 203 in FIG. 3, respectively. Those signal lines are collectively regarded as the control signal line 233 of the 3rd A/D converter circuit 203 in FIG. 2.

Note that although FIG. 9 illustrates the control signal line 231 included in the 1st A/D converter circuit 201 to the control signal line 233 included in the 3rd A/D converter circuit 203, which are illustrated in FIG. 2, in a similar way, the control signal line 234 included in the 4th A/D converter circuit 204 to the control signal line 239 included in the 9th A/D converter circuit 209 can be provided.

In FIG. 1, in the case where a shift register is included in the display element driver circuit 107 on the signal line side, the touch panel 100 includes the shift register. Therefore, when using the structure in which the timing signal generator circuit 600 and the display element driver circuit 107 shares a shift register as shown in FIG. 9, only the logic circuit 652 is added to the touch panel 100 in order that the timing signal generator circuit 600 may be mounted. Accordingly, an increase of the frame region due to the mounting of the timing signal generator circuit 600 can be restrained; thus, a touch panel which has high display quality can be obtained.

In addition, the fact that the structure in FIG. 9 is effective for higher performance of the touch panel such as improvement in spatial resolution or in number of gray scale levels is described.

In the structure in FIG. 9, in order to improve spatial resolution of the touch panel, the number of A/D converter circuits increases in the column direction; however, in the timing signal generator circuit 600, an increase in number of stages of the shift register 651 in the column direction can allow the improvement. Here, an area required for the increase in number of stages of the shift register 651 is much smaller than an area required for leading wirings for the structure where an external driving circuit is provided. Accordingly, the structure in FIG. 9 can restrain an increase in layout area. Note that in the structure in FIG. 9, the number of signal lines for inputting signals from an external portion to the touch panel does not increase even when the number of stages of the shift register 651 increases.

In addition, in the structure in FIG. 9, in order to improve the number of gray scale levels of the touch panel, the number of bits of each A/D converter circuit increases; however, in the timing signal generator circuit 600, the improvement is realized by increasing the number of stages of the shift register 651 in the column direction and adding logic element circuits to the logic circuit 652 as appropriate. Here, as a logic element circuit, a NOT circuit, an OR circuit, an AND circuit, an XOR circuit, a NOR circuit, a NAND circuit, an XNOR circuit, or the like is used.

In addition, in general, a layout area for a logic element circuit is smaller than that for a shift register. Therefore, in the structure in FIG. 9, the increase in layout area for the logic circuit 652 due to the addition of the logic element circuit has little influence on an increase in layout area for the whole timing signal generator circuit 600. Accordingly, the increase in number of stages of the shift register 651 can be realized while the increase in layout area is restrained at the same time.

With the structure described above, a touch panel with a high spatial resolution and a large number of gray scale levels, which is restrained from increasing in the frame region and is good in the quality of display, can be obtained.

Embodiment 5

In this embodiment, the touch panel described in Embodiments 1 to 4 is described with reference to FIGS. 10 and 11. In this embodiment, the touch panel includes a photo sensor and a display element. The display element includes a liquid crystal element or a light emitting element.

Figure 10:
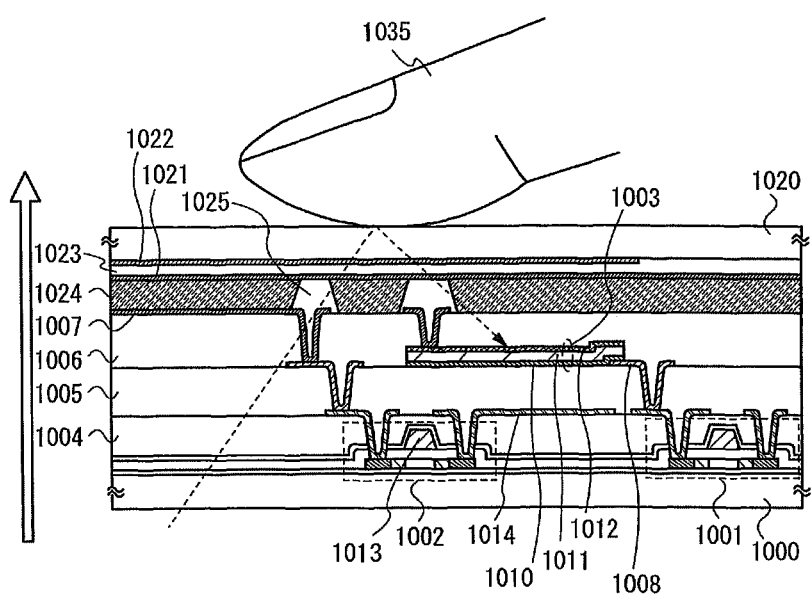
FIG. 10 illustrates an example of a cross section of a liquid crystal display device including a touch panel.

FIG. 10 illustrates, as for the touch panel described in Embodiments 1 to 4, an example of the cross-sectional view of a liquid crystal display device which includes a liquid crystal element as a display element. A situation is illustrated where light from a backlight reflects off a finger 1035, which is an object supposed to be detected, and is shone on a photo sensor 1003.

As a substrate 1000, a light-transmitting substrate such as a glass substrate or a quartz substrate is used. Over the substrate 1000, a thin film transistor 1001, a thin film transistor 1002, and a photo sensor 1003 are provided. The photo sensor 1003 is formed by stacking an n-type semiconductor layer 1010, an i-type semiconductor layer 1011, and a p-type semiconductor layer 1012 in the order presented. The n-type semiconductor layer 1010 contains an impurity element imparting n-type conductivity (e.g., phosphorus). The i-type semiconductor layer 1011 is an intrinsic semiconductor. The p-type semiconductor layer 1012 contains an impurity element imparting p-type conductivity (e.g., boron).

In FIG. 10, top gate thin film transistors are used as the thin film transistors 1001 and 1002; however, this embodiment is not limited to this. As the thin film transistors 1001 and 1002, bottom gate thin film transistor can also be used. Further, the photo sensor 1003 has a structure where the n-type semiconductor layer 1010, the i-type semiconductor layer 1011, and the p-type semiconductor layer 1012 are provided; however, this embodiment is not limited to this.

In this embodiment, a crystalline semiconductor layer can be used as each semiconductor layer included in the thin film transistor 1001 and the thin film transistor 1002. For example, polysilicon can be used; however, this embodiment is not limited to this. Amorphous silicon, single crystal silicon, organic semiconductor such as pentacene, oxide semiconductor, etc. can be used as each semiconductor layer included in the thin film transistor 1001 and the thin film transistor 1002. In order to form a semiconductor layer of single crystal silicon over the substrate 1000, the substrate 1000 is bonded to a single crystal silicon substrate in which a damaged region is provided at a predetermined depth from the surface, and the single crystal silicon substrate is separated at the damaged region. In addition, for the oxide semiconductor, a composite oxide of elements selected from indium, gallium, aluminum, zinc, and tin can be used.

An insulating layer 1004 is provided so as to cover the thin film transistors 1001 and 1002. An insulating layer 1005 is provided over the insulating layer 1004, and an insulating layer 1006 is provided over the insulating layer 1005. A pixel electrode 1007 is provided over the insulating layer 1006, and the photo sensor 1003 and a lower electrode 1008 are provided over the insulating layer 1005. Owing to the lower electrode 1008, the photo sensor 1003 and the thin film transistor 1001 are electrically connected to each other through an opening portion provided in the insulating layer 1005.

In addition, a counter substrate 1020 is provided with a counter electrode 1021, a color filter layer 1022, and an overcoat layer 1023. The counter substrate 1020 and the substrate 1000 are fixed to each other with a sealant, and the substrates are kept at a predetermined distance by a spacer 1025. A liquid crystal layer 1024 is interposed between the pixel electrode 1007 and the counter electrode 1021, whereby a liquid crystal element is formed.

The color filter layer 1022 may be provided so as to overlap with both the photo sensor 1003 and the pixel electrode 1007 as illustrated in FIG. 10.

Further, the photo sensor 1003 overlaps with a gate electrode 1013 of the thin film transistor 1002 as illustrated in FIG. 10 and the photo sensor 1003 is preferably provided so as to overlap also with a signal line 1014 of the thin film transistor 1002.

A backlight is provided in the liquid crystal display device in this embodiment. In FIG. 10, the backlight is provided on the substrate 1000 side, and light is emitted in the direction indicated by a dotted arrow. For the backlight, a cold-cathode fluorescent lamp: (CCFL) or a white light emitting diode can be used. A white light-emitting diode is preferable because the adjustable range of brightness is wider than that of a cold-cathode fluorescent lamp.

Besides that, the brightness (luminance) of the backlight can be adjusted so as to enable a display appropriate for the circumstance where the touch panel is used by providing the photo sensor 1003, for example, in a driver circuit portion, which includes the photo sensor control circuit or the display element control circuit, to detect outside light.

In addition, there is no limitation on the structure of the backlight above. For example, the backlight may include light-emitting diodes (LED) of RGB. Further, a color display may be produced by a field sequential method in which the LED backlights of RGB are sequentially lit. A color filter layer is not necessary in that case.

Here, an example of the method for manufacturing the liquid crystal display device illustrated in FIG. 10 is briefly described.

First, top gate thin film transistors each including a crystalline semiconductor layer as active layers are formed. Here, the thin film transistor 1002 including the gate electrode 1013 and the thin film transistor 1001 which is electrically connected to the photo sensor 1003 are formed over one substrate. An n-type thin film transistor or a p-type thin film transistor can be used as each transistor. In addition, a storage capacitor can be formed in the same steps as the transistors. Note that the storage capacitor may use the semiconductor layer as a lower electrode and a capacitor wiring as an upper electrode, and an insulating film, which is formed in the same steps as a gate insulating film of the thin film transistor 1001 and the thin film transistor 1002, as a dielectric.

Contact holes are formed in the insulating layer 1004 which is one of interlayer insulating layers of the thin film transistors. Then, a source electrode or a drain electrode, which is electrically connected to the semiconductor layer of each of the thin film transistors, or else a connection electrode, which is connected to an upper wiring, is formed. Moreover, a signal line of the thin film transistor 1001 which is electrically connected to the photo sensor 1003 is formed in the same steps. The signal line 1014 of the thin film transistor 1002 is formed in the same steps.

Next, the insulating layer 1005 which covers the signal line 1014 is formed. Note that since a transmissive liquid crystal display device is described as an example in this embodiment, the insulating layer 1005 uses an insulating material which transmits visible light. Then, contact holes are formed in the insulating layer 1005, and the lower electrode 1008 is formed over the insulating layer 1005.

Then, the photo sensor 1003 is formed so as to overlap with at least part of the lower electrode 1008. The lower electrode 1008 is an electrode for electrically connecting the photo sensor 1003 and the thin film transistor 1001. The photo sensor 1003 is formed by stacking the n-type semiconductor layer 1010, the i-type semiconductor layer 1011, and the p-type semiconductor layer 1012 in the order presented. In this embodiment, by using a plasma CVD method, the n-type semiconductor layer 1010 is formed using microcrystalline silicon containing phosphorus, the i-type semiconductor layer 1011 is formed using amorphous silicon, and the p-type semiconductor layer 1012 is formed using microcrystalline silicon containing boron.

Next, the insulating layer 1006 which covers the photo sensor 1003 is formed. In the case of the transmissive liquid crystal display device, an insulating material which transmits visible light is used for the insulating layer 1006. Then, contact holes are formed in the insulating layer 1006, and the pixel electrode 1007 is formed over the insulating layer 1006.

A wiring is formed from the same layer as that of the pixel electrode 1007. The wiring is electrically connected to the p-type semiconductor layer 1012 which is an upper electrode of the photo sensor 1003.

Then, the spacer 1025 is formed over the insulating layer 1006. A columnar spacer (a post spacer) is used as the spacer 1025 in FIG. 10; however, a spherical spacer (a bead spacer) is also available.

Next, when a TN liquid crystal or the like is used as the liquid crystal layer 1204, an alignment film is formed over the pixel electrode 1007 by coating, and rubbing treatment is performed.

Meanwhile, the color filter layer 1022, the overcoat layer 1023, and the counter electrode 1021 are formed over the counter substrate 1020. Then, an alignment film is formed over the counter electrode 1021 by coating, and rubbing treatment is performed.

After that, a surface of the substrate 1000, over which the alignment film is formed by coating, and a surface of the counter substrate 1020, over which the alignment film is formed by coating, are attached to each other with a sealant. A liquid crystal is placed between these substrates by a liquid crystal dripping method or a liquid crystal injection method, whereby the liquid crystal layer 1024 is formed.

Alternatively, a blue-phase liquid crystal for which an alignment film is not necessary may be used for the liquid crystal layer 1024. A blue phase is one of the liquid crystal phases, which is generated just before a cholesteric phase changes into an isotropic phase while temperature of cholesteric liquid crystal is increased. Since the blue phase appears only in a narrow temperature range, in order that the blue phase may be applied to the liquid crystal layer 1024, a liquid crystal composition in which 5 wt. % or more of a chiral material is mixed to broaden the temperature range is used. As for the liquid crystal composition which contains a blue-phase liquid crystal and a chiral material, the response speed is as high as 10 μs to 100 μs, alignment treatment is not necessary due to optical isotropy, and viewing angle dependence is low.

Next, an electroluminescent display device (hereinafter referred to as an "EL display device"), which includes a light-emitting element as a display element in the touch panel described in Embodiments 1 to 4, is described.

Figure 11:
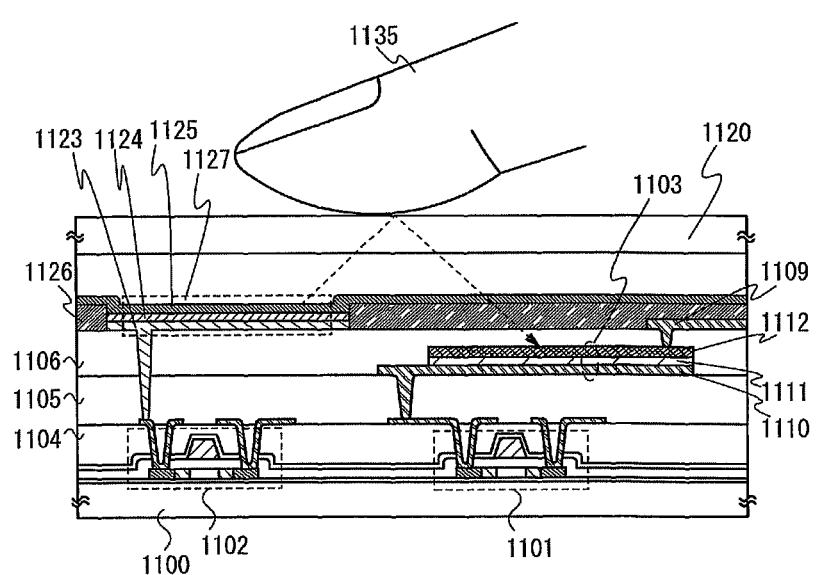
FIG. 11 illustrates an example of a cross section of an EL display device including a touch panel.

FIG. 11 illustrates an example of the cross-sectional view of an EL display element with an EL element (for example, an organic EL element, an inorganic EL element, or an EL element including an organic substance and an inorganic substance) as a light-emitting element in the touch panel above. A situation is illustrated where light emitted from an EL element 1127 reflects off a finger 1135, which is an object supposed to be detected, and is shined on a photo sensor 1103.

In FIG. 11, over a substrate 1100, a thin film transistor 1101, a thin film transistor 1102, and a photo sensor 1103 are provided. The photo sensor 1103 is formed by stacking an n-type semiconductor layer 1110, an i-type semiconductor layer 1111, and a p-type semiconductor layer 1112 in the order presented. The substrate 1100 is fixed to a counter substrate 1120 with a sealant.

An insulating layer 1104 is provided so as to cover the thin film transistors 1101 and 1102. An insulating layer 1105 is provided over the insulating layer 1104, and an insulating layer 1106 is provided over the insulating layer 1105. An EL element 1127 is provided over the insulating layer 1106, and the photo sensor 1103 is provided over the insulating layer 1105. With the n-type semiconductor layer 1110, the photo sensor 1103 and the thin film transistor 1101 are electrically connected through an opening portion provided in the insulating layer 1105.

Further, with a sensor wiring 1109, the p-type semiconductor layer 1112 and another wiring are electrically connected.

The EL element 1127 is formed by stacking a pixel electrode 1123, a light-emitting layer 1124, and a counter electrode 1125 in the order presented. Note that a bank 1126 separates light-emitting layers of pixels next to each other.

An n-type thin film transistor or a p-type thin film transistor can be used as each of the thin film transistor 1101 and the thin film transistor 1102. In the case where the pixel electrode 1123 functions as a cathode, the thin film transistor 1102, which is electrically connected to the pixel electrode 1123, is preferably made an n-type thin film transistor considering the direction of current. Further, in the case where the pixel electrode 1123 functions as an anode, the thin film transistor 1102 is preferably made a p-type thin film transistor.

Note that this embodiment can be freely combined with any of Embodiments 1 to 4.

Embodiment 6

In this embodiment, an example of an electronic device to which the touch panel described in Embodiments 1 to 5 is applied in the display portion is described with reference to FIGS. 12A and 12B, and to FIGS. 13A and 13B.

Figure 12A:
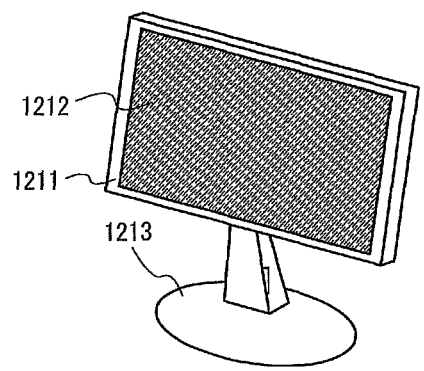
FIGS. 12A and 12B each illustrate an example of an electronic device using a touch panel.

FIG. 12A illustrates a monitor type touch panel to which the touch panel described in the embodiments above is applied. The monitor type touch panel illustrated in FIG. 12A includes a chassis 1211, a display portion 1212, a support 1213, and the like. The touch panel which is described in the embodiments above is incorporated in the chassis 1211, and a photo sensor is provided in each pixel of the display portion 1212. The display portion 1212 has a display function and an information input function. With the use of the touch panel which is described in the embodiments above, high-sensitivity detection can be performed, thereby obtaining a monitor type touch panel with high accuracy in reading.

Figure 12B:
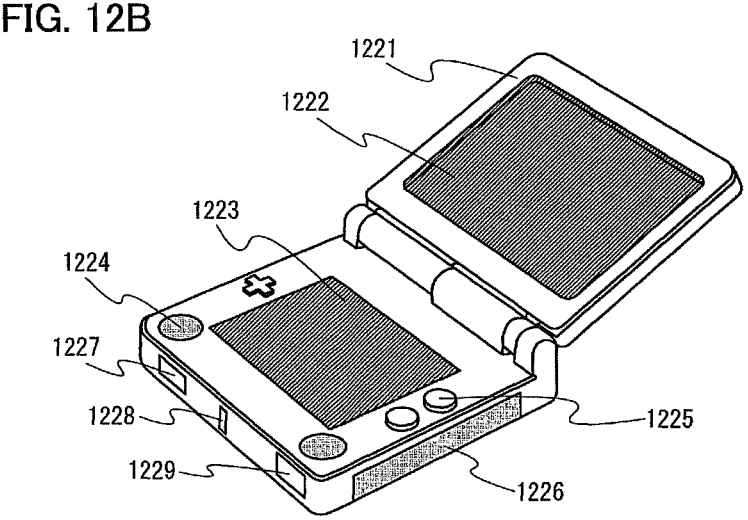

FIG. 12B illustrates a portable game machine to which the touch panel described in the embodiments above is applied. The portable game machine illustrated in FIG. 12B includes a chassis 1221, a 1st display portion 1222, a 2nd display portion 1223, speaker portions 1224, operation keys 1225, a storage medium insertion portion 1226, an external connection port 1227, an LED lamp 1228, and a microphone 1229. The portable game machine illustrated in FIG. 12B has a function of reading out a program or data stored in a storage medium and displaying an image on the 1st and 2nd display portions 1222 and 1223. Further, it is possible for the portable game machine to share information with another portable game machine by wireless communication. When the touch panel, which is described in the embodiments above, is applied to one or both of the 1st display portion 1222 and the 2nd display portion 1223, high-sensitivity detection can be performed. Therefore, high accuracy in reading and improvement in security can be achieved, thereby obtaining a game machine which provides a more complicated and sophisticated game than the conventional one.

Figure 13A:
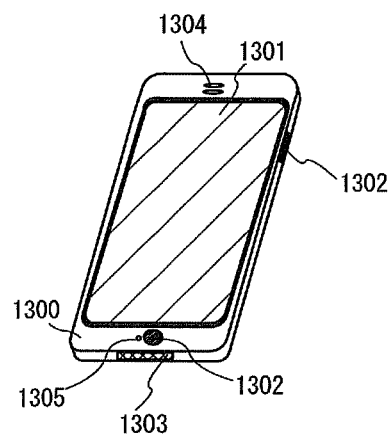
FIGS. 13A and 13B each illustrate an example of a mobile phone using a touch panel.
Figure 13B:
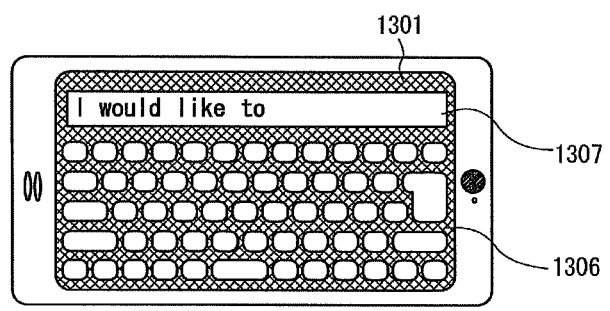

FIGS. 13A and 13B illustrate an example of a mobile phone (a so-called smartphone) to which the touch panel described in the embodiments described above is applied. The mobile phone illustrated in FIG. 13A includes a chassis 1300, a display portion 1301, an operation button 1302, an external connection port 1303, a speaker 1304, and a microphone 1305. By touching the display portion 1301 with a finger or the like, information can be input to the mobile phone.

There are mainly three screen modes of the display portion 1301. The 1st mode is a display mode mainly for displaying an image. The 2nd mode is an input mode mainly for inputting data such as text. The 3rd mode is a display-and-input mode in which two modes of the display mode and the input mode are combined.

FIG. 13B illustrates a front view of the mobile phone in the input mode. As illustrated in FIG. 13B, a keyboard 1306 is displayed in the display portion 1301. Letters input from the keyboard 1306 are displayed on a screen 1307. Since a letter input operation takes priority in the input mode, the keyboard 1306 is displayed on almost the entire screen of the display portion 1301. Key arrangement of the keyboard 1306 is changed depending on the language.

When a sensor for detecting inclination, such as an acceleration sensor, is provided inside the mobile phone illustrated in FIGS. 13A and 13B, it is possible to determine the orientation of the mobile phone (whether the mobile phone is placed horizontally or vertically for a landscape mode or a portrait mode) and switch automatically a screen display on the display portion 1301.

Further, the screen modes are switched by contact with the display portion 1301 (touch operation) or by operation of the operation button 1302. Alternatively, the screen modes may be switched depending on the kind of the image displayed on the display portion 1301. For example, it is possible to select the screen mode when the signal for an image to be displayed on the display portion 1301 is moving images data, and the input mode, which is selected when the image signal is text data.

Moreover, in the input mode, a signal detected by a photo sensor in the display portion 1301 may be determined and in the case where input by touch operation to the display portion 1301 is not performed for a certain period of time, the screen mode may be switched from the input mode to the display mode.

The touch panel described in the embodiments above can be applied to the display portion 1301. For example, an image of a palm print, a fingerprint, or the like is taken when touching the display portion 1301 with the palm or the finger, whereby personal authentication can be performed. Further, by providing a backlight or a sensing light source which emits near-infrared light in the display portion 1301, an image of finger veins, palm veins, or the like can be taken. Since high-sensitivity detection can be realized by applying the touch panel described in the embodiments above, a mobile phone including a touch panel with high accuracy in reading can be obtained. Therefore, when a finger print of a user, for example, is registered, a mobile phone with high security which can be used only by the user whose finger print has been registered can be obtained.

As described above, by applying the touch panel described in the embodiments above, electronic devices with display portions having the effects described above can be obtained.

Note that this embodiment can be freely combined with any of Embodiments 1 to 5.

This application is based on Japanese Patent Application serial no. 2008-327901 filed with Japan Patent Office on Dec. 24, 2008, the entire contents of which are hereby incorporated by reference.

EXPLANATION OF REFERENCE

100: touch panel, 101: pixel circuit, 102: display element control circuit, 103: photo sensor control circuit, 104: pixel, 105: display element, 106: photo sensor, 107: display element driver circuit, 108: display element driver circuit, 109: photo sensor reading circuit, 110: photo sensor driver circuit, 201 to 209: A/D converter circuit, 210: reading circuit, 211 to 219: photo sensor signal line, 220: output signal line, 221 to 229: output signal line, 231 to 239: control signal line, 301: comparator circuit, 302: successive approximation register, 303: D/A converter circuit, 304: output signal line, 305: output signal line, 306: output signal line, 307: output signal line, 308: holding circuit, 309: holding circuit, 310: enable signal line, 311: reset signal line, 312: reset signal line, 313: set signal line, 314: set signal line, 401 to 410: signal, 501 to 515: signal, 600: timing signal generator circuit, 601 to 615: edge sensitive latch, 616: start signal line, 617: clock signal line, 621 to 635: output signal line, 640: OR circuit, 641: output signal line, 642: OR circuit, 643: output signal line, 644: OR circuit, 645: output signal line, 651: shift register, 652: logic circuit, 701 to 718: signal, 900: display element select circuit, 901 to 915: selector, 916: image signal input line, 921 to 935: source signal line, 1000: substrate, 1001: thin film transistor, 1002: thin film transistor, 1003: photo sensor, 1004: insulating layer, 1005: insulating layer, 1006: insulating layer, 1007: pixel electrode, 1008: lower electrode, 1010: n-type semiconductor layer, 1011: i-type semiconductor layer, 1012: p-type semiconductor layer, 1013: gate electrode, 1014: signal line, 1020: counter substrate, 1021: counter electrode, 1022: color filter layer, 1023: overcoat layer, 1024: liquid crystal layer, 1025: spacer, 1035: finger, 1100: substrate, 1101: thin film transistor, 1102: thin film transistor, 1103: photo sensor, 1104: insulating layer, 1105: insulating layer, 1106: insulating layer, 1109: sensor wiring, 1110: n-type semiconductor layer, 1111: i-type semiconductor layer, 1112: p-type semiconductor layer, 1120: counter substrate, 1123: pixel electrode, 1124: light-emitting layer, 1125: counter electrode, 1126: bank, 1127: EL element, 1135: finger, 1211: chassis, 1212: display portion, 1213: support, 1221: chassis, 1222: display portion, 1223: display portion, 1224: speaker portion, 1225: operation key, 1226: storage medium insertion portion, 1227: external connection port, 1228: LED lamp, 1229: microphone, 1300: chassis, 1301: display portion, 1302: operation button, 1303: external connection port, 1304: speaker, 1305: microphone, 1306: keyboard, 1307: screen

The invention claimed is:

1. A touch panel comprising:
   a plurality of photo sensors;
   a plurality of A/D converter circuits configured to be input with photo sensor signals of the plurality of photo sensors; and
   a timing signal generator circuit comprising:
      a shift register comprising a plurality of latches provided in series; and
      a logic circuit configured to generate signal by performing logic operation on plural output signals of the shift register;
   wherein the timing signal generator circuit is configured to generate a plurality of control signals for controlling the plurality of A/D converter circuits in time sequence,
   wherein each of the plurality of control signals comprises plural output signals of the shift register and the signal generated by the logic circuit, and
   wherein the plurality of A/D converter circuits are configured to operate converting the photo sensor signals in accordance with the plurality of control signals in time sequence.

2. The touch panel according to claim 1, wherein the logic circuit comprises at least one OR circuit.

3. The touch panel according to claim 1, wherein the latches are edge sensitive latches or level sensitive latches.

4. An electronic device comprising the touch panel according to claim 1 in a display portion.

5. The touch panel according to claim 1,
wherein a pixel circuit comprises a plurality of pixels each comprising a display element and the photo sensor,
wherein each of the plurality of pixels comprises a thin film transistor, and
wherein a semiconductor layer of the thin film transistor comprises a polysilicon.

6. The touch panel according to claim 1,
wherein a pixel circuit comprises a plurality of pixels each comprising a display element and the photo sensor,
wherein each of the plurality of pixels comprises a thin film transistor, and
wherein a semiconductor layer of the thin film transistor comprises an amorphous silicon.

7. The touch panel according to claim 1,
wherein a pixel circuit comprises a plurality of pixels each comprising a display element and the photo sensor,
wherein each of the plurality of pixels comprises a thin film transistor, and
wherein a semiconductor layer of the thin film transistor comprises a single crystal silicon.

8. The touch panel according to claim 1,
wherein a pixel circuit comprises a plurality of pixels each comprising a display element and the photo sensor,
wherein each of the plurality of pixels comprises a thin film transistor, and
wherein a semiconductor layer of the thin film transistor comprises an organic semiconductor.

9. The touch panel according to claim 1,
wherein a pixel circuit comprises a plurality of pixels each comprising a display element and the photo sensor,
wherein each of the plurality of pixels comprises a thin film transistor, and
wherein a semiconductor layer of the thin film transistor comprises an oxide semiconductor.

10. A touch panel comprising:
a plurality of photo sensors;
a plurality of A/D converter circuits configured to be input with photo sensor signals of the plurality of photo sensors;
a display element select circuit configured to supply an image signal to a display element; and
a timing signal generator circuit comprising:
    a shift register comprising a plurality of latches provided in series; and
    a logic circuit configured to generate signal by performing logic operation on plural output signals of the shift register;
wherein the timing signal generator circuit is configured to generate a plurality of control signals for controlling the plurality of A/D converter circuits in time sequence,
wherein each of the plurality of control signals comprises plural output signals of the shift register and the signal generated by the logic circuit,
wherein the plurality of A/D converter circuits are configured to operate converting the photo sensor signals in accordance with the plurality of control signals in time sequence, and
wherein the display element select circuit is configured to be controlled by output signals of the shift register.

11. The touch panel according to claim 10,
wherein the display element select circuit comprises a selector controlled by an output signal of one of the plurality of latches, and
wherein the selector switches between connection and interruption of a path for supplying the image signal to the display element.

12. The touch panel according to claim 1, wherein each of the plurality of A/D converter circuits is a successive approximation A/D converter circuit.

13. The touch panel according to claim 10, wherein the logic circuit comprises at least one OR circuit.

14. The touch panel according to claim 10, wherein the latches are edge sensitive latches or level sensitive latches.

15. An electronic device comprising the touch panel according to claim 10 in a display portion.

16. The touch panel according to claim 10,
wherein a pixel circuit comprises a plurality of pixels each comprising the display element and the photo sensor,
wherein each of the plurality of pixels comprises a thin film transistor, and
wherein a semiconductor layer of the thin film transistor comprises a polysilicon.

17. The touch panel according to claim 10,
wherein a pixel circuit comprises a plurality of pixels each comprising the display element and the photo sensor,
wherein each of the plurality of pixels comprises a thin film transistor, and
wherein a semiconductor layer of the thin film transistor comprises an amorphous silicon.

18. The touch panel according to claim 10,
wherein a pixel circuit comprises a plurality of pixels each comprising the display element and the photo sensor,
wherein each of the plurality of pixels comprises a thin film transistor, and
wherein a semiconductor layer of the thin film transistor comprises a single crystal silicon.

19. The touch panel according to claim 10,
wherein a pixel circuit comprises a plurality of pixels each comprising the display element and the photo sensor,
wherein each of the plurality of pixels comprises a thin film transistor, and
wherein a semiconductor layer of the thin film transistor comprises an organic semiconductor.

20. The touch panel according to claim 10,
wherein a pixel circuit comprises a plurality of pixels each comprising the display element and the photo sensor,
wherein each of the plurality of pixels comprises a thin film transistor, and
wherein a semiconductor layer of the thin film transistor comprises an oxide semiconductor.

21. A driving method of a touch panel,
wherein the touch panel comprises:
a plurality of photo sensors;
a plurality of A/D converter circuits configured to be input with photo sensor signals of the plurality of photo sensors; and
a timing signal generator circuit comprising:
    a shift register comprising a plurality of latches provided in series; and
    a logic circuit, and
wherein the driving method performs the following steps to each of the plurality of A/D converter circuits in time sequence:
inputting plural output signals of the shift register to the logic circuit;

generating a signal by performing logic operation in the logic circuit on the plural output signals of the shift register; and inputting the signal generated by the logic circuit and plural output signals of the shift register to one of the plurality of A/D converter circuits so as to operate A/D conversion of a signal output from a photo sensor.

22. The driving method of a touch panel according to claim 21, wherein the plurality of latches of the shift register input the plural output signals to the logic circuit by sequentially shifting a start signal in synchronization with a clock signal.

23. The driving method of a touch panel according to claim 21, wherein edge sensitive latches or level sensitive latches are used as the latches.

24. A driving method of a touch panel,
wherein the touch panel comprises:
a plurality of photo sensors;
a plurality of A/D converter circuits configured to be input with photo sensor signals of the plurality of photo sensors;
a display element select circuit; and
a timing signal generator circuit comprising:
   a shift register comprising a plurality of latches provided in series; and
   a logic circuit, wherein the driving method performs the following steps to each of the plurality of A/D converter circuits in time sequence:

inputting plural output signals of the shift register to the logic circuit and to the display element select circuit;

generating a signal by performing a logic operation in the logic circuit on the plural output signals of the shift register; and inputting the signal generated by the logic circuit and plural output signals of the shift register to one of the plurality of A/D converter circuits so as to operate A/D conversion of a signal output from a photo sensor, and wherein an image signal is supplied to a display element through the display element select circuit in accordance with output signals of the plurality of latches of the shift register which have been input to the display element select circuit.

25. The driving method of a touch panel according to claim 24, wherein the plurality of latches of the shift register input the plural output signals to the logic circuit by sequentially shifting a start signal in synchronization with a clock signal.

26. The driving method of a touch panel according to claim 24, wherein edge sensitive latches or level sensitive latches are used as the latches.

* * * * *